(12) United States Patent
Hoffman et al.

(10) Patent No.: US 6,802,886 B2
(45) Date of Patent: Oct. 12, 2004

(54) METHOD OF PRODUCING A METALLIZED BRIQUETTE

(75) Inventors: Glenn E. Hoffman, Lancaster, SC (US); James M. McClelland, Jr., Cornelius, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 0 days.

(21) Appl. No.: 09/852,866

(22) Filed: May 10, 2001

(65) Prior Publication Data

US 2001/0047699 A1 Dec. 6, 2001

Related U.S. Application Data

(60) Provisional application No. 60/209,526, filed on Jun. 5, 2000.

(51) Int. Cl.[7] .................................................. C21B 13/12
(52) U.S. Cl. .............................. 75/484; 75/503; 75/771; 75/772
(58) Field of Search ........................... 75/484, 503, 771, 75/772, 770

(56) References Cited

U.S. PATENT DOCUMENTS

| 2,865,731 A | * | 12/1958 | Crowe ........................... 75/321 |
| 4,701,214 A | | 10/1987 | Kaneko et al. ................. 75/38 |
| 5,421,859 A | * | 6/1995 | Wienert ........................ 75/766 |
| 5,464,465 A | * | 11/1995 | Avotins et al. ................ 75/313 |
| 5,730,775 A | | 3/1998 | Meissner et al. .............. 75/436 |
| 5,833,735 A | * | 11/1998 | Grandin et al. ............... 75/320 |

FOREIGN PATENT DOCUMENTS

CA          1002761          1/1977

\* cited by examiner

*Primary Examiner*—Melvyn Andrews
(74) *Attorney, Agent, or Firm*—Dougherty, Clements, Hofer & Bernard

(57) ABSTRACT

The invention is a method of making metallized iron agglomerates by combining iron/steel particles and a reductant material with a cellulose fiber binder material, compacting the combination to form a solid agglomerate, and reducing the iron portions of the agglomerate in a direct reduction furnace. The cellulose fiber binder material provides an agglomerate having improved strength and lower overall cost than comparable agglomerates using binders known in the art.

8 Claims, 4 Drawing Sheets

METHOD OF PRODUCING A METALLIZED BRIQUETTE

CROSS REFERENCE TO RELATED APPLICATIONS

This application claims priority from Provisional Patent Application, Ser. No. 60/209,526, filed Jun. 5, 2000.

FIELD OF THE INVENTION

The present invention relates to a method of producing a carbon-bearing metallized iron briquette, and the resulting briquette.

BACKGROUND OF THE INVENTION

Modern methods of producing steel result in large quantities of steel dusts and other wastes associated with steel production. Most steelmakers are searching for ways to recycle steel dusts. Proper recycling of steel dusts would allow steelmakers to reclaim valuable minerals otherwise lost as waste, and would lower the amount of environmentally hazardous materials which must be handled and disposed of properly.

The search for a method of recycling steel mill waste is driven by several factors. First and foremost are concerns related to the loss of valuable minerals. Large amounts of steel mill wastes are produced along with every ton of finished steel produced. The steel mill wastes contain percentages of iron, iron oxides, other metal oxide components, and carbon which are collected from the baghouse and water treatment apparatus of the steel mill. Through proper processing, the waste iron material can be directly reduced and melted in order to reclaim the valuable iron components. Of course, reclamation results in lower raw material costs to the steel mill.

Environmental concerns have also prompted the search for efficient methods of recycling steel mill wastes. Some steel mill wastes, such as baghouse dust from an electric arc furnace (EAF) are considered hazardous material, which must be treated before disposal. Costs of such treatment are extremely high. Even steel mill wastes which are not necessarily considered hazardous have high associated costs of land filling or other disposal due to the large volume of waste which is produced with each ton of steel.

Steelmakers have developed a method of recycling steel mill waste by collecting the waste, combining the waste with a reducing agent, compacting the combination into a solid agglomerate, then heating the agglomerate, thereby causing direct reduction of the iron materials within the agglomerate, and finally charging the directly reduced agglomerates to a steel making furnace. Methods of forming the agglomerate, known as a "green" agglomerate prior to being directly reduced, are well known in the art. An example of processing steel mill wastes into an agglomerate for direct production is found in U.S. Pat. No. 4,701,214 to Kaneko, et al., which describes a method of mixing iron oxide dust or iron ore fines with finely divided coal and a binder to form a mixture, agglomerating the mixture by compacting, pelletizing, or briquetting the mixture to form agglomerates or pellets, introducing the pellets to a rotary hearth furnace to pre-reduce the iron in the pellets, introducing the pre-reduced pellets into a smelting reduction vessel as the metallic charge constituent, introducing particulate carbonaceous fuel and oxygen to the smelting reduction vessel through the bottom of the vessel to react with the melt or bath within the vessel, reduce the iron to elemental iron and form an off gas containing CO and $H_2$ introducing the off-gas into the rotary hearth furnace as process gas to pre-reduce the pellets therein, and drawing off the hot metal from the smelting reduction vessel.

The most advanced method of utilizing agglomerates of iron oxide fines to form a directly reduced charge to a steel furnace is seen in U.S. Pat. No. 5,730,775 to Meissner et al. which describes a method and apparatus for producing direct reduced iron from dry compacts composed of iron oxide and carbonaceous material by feeding compacts no more than two layers deep onto a hearth and removing all the volatiles and metallizing the compacts by exposing said compacts to a radiant heat source at a temperature of from about 2400° F. to about 2600° F.

To form the green agglomerates of the prior art, iron containing dust and/or iron ore is combined with a reducing agent, usually a carbonaceous material such as coal or coke. The agglomerate material may be wetted or dried, depending on process conditions. Finally, a binding agent is added to the mix before the mixture is compacted into a briquette.

The success of the recycle of steel dust through the direct reduction of steel dust green agglomerates depends heavily upon the quality of briquette formed prior to direct reduction. It is essential that the briquettes retain their physical integrity throughout their transit from the point of entering the direct reduction furnace to the point of entering the steel making furnace. If the briquettes fracture or disintegrate during direct reduction, then the broken fragments are subject to rapid reduction with subsequent oxidation. In the worst case, fragmented agglomerates will be reoxidized to FeO. Those agglomerate fragments which are not lost upon transfer of the agglomerates from the direct reduction furnace to the steel making furnace tend to rapidly reoxidize and melt into the slag upon injection into the steelmaking furnace or to be sucked immediately out of the steel making furnace by the off-gas containment system. Thus, loss of agglomerate material as broken fragments or dust dramatically decreases the efficiency of the steel dust recycle system.

To prevent fragmentation of the agglomerate, binders are added to the material. Choice of a binder for use in green agglomerates is often a tradeoff between cost and detriment to downstream processing. Binders traditionally used in agglomerate formation are sodium silicate, 1% lime & 3% molasses, pitch based binders, and cement. Sodium silicate produces agglomerates that are known to become weak or decrepitate upon heating, and the sodium silicate decomposes into unwanted alkali compounds, which may cause refractory damage within the furnace. Cement binders tend to increase the relative gangue content such that the slag level in the subsequent melting step becomes prohibitively high. Lime/molasses combinations and pitch based binders have acceptable performance but are comparatively costly.

There exists a need for a binder and process of utilizing a binder for steel dust agglomeration which is low in cost and results in a green agglomerate with improved crush strength, thus avoiding fracture of the agglomerate during the direct reduction process or related transportation. There is a further need for a binder and process of utilizing the binder which minimizes any downstream environmental impact and minimizes any other adverse effects on the steel making process.

OBJECTS OF THE INVENTION

It is therefore an object of the present invention to provide a process for making a strong agglomerate for further processing into carbon-bearing steel.

Another object of the invention is to provide a carbon-bearing direct reduced iron agglomerate having a metallization of at least 40%, and preferably greater than 80%, with improved strength.

SUMMARY OF THE INVENTION

The invention is a method of making metallized iron agglomerates by combining iron/steel particles and a reductant material with a cellulose fiber binder material, compacting the combination to form a solid agglomerate, and reducing the iron portions of the agglomerate in a direct reduction furnace. The cellulose fiber binder material provides an agglomerate having improved strength and lower overall cost than comparable agglomerates using binders known in the art.

The cellulose fiber material may be derived from any suitable source of cellulose fiber, and is preferably derived from waste materials such as paper, cardboard, wood scrap, bagasse, or municipal waste. Iron particles are received from waste streams of the steel making process, including baghouse dust and particulate matter from broken briquettes and pellets. Additional virgin iron components may also be added to the mixture. A reducing agent, preferably pulverized coal, is added if needed for proper reduction of the agglomerate.

The agglomerate may be a briquette formed by roll briquetting, a pellet formed by disk/drum pelletizing methods, extrusion, or other know methods of agglomerate preparation. The agglomerates are heated in a furnace for a period of 6 to 20 minutes, resulting in a very strong, carbon-containing treated product, which is extremely well suited as a feed material to an ironmaking or a steelmaking furnace.

BRIEF DESCRIPTION OF THE DRAWINGS

The foregoing and other objects will become more readily apparent by referring to the following detailed description and the appended drawings in which.

DETAILED DESCRIPTION

In accordance with the invention, cellulose fiber is used as a binder in the production of green agglomerates for use in the direct reduction of iron containing material. Using a cellulose binder and the invented methods disclosed herein, green agglomerates are produced from sized iron-bearing material and sized reductant which impart sufficient green strength to green agglomerates so the agglomerates can be charged directly to a rotary hearth furnace, or other furnace, without fragmenting or generating fines; so that they achieve superior strength during heating without compromising the thermal process step or the process equipment; and so that they are more economical, over all, than agglomerates produced with other binders.

The cellulose fiber used as a binder in the production of green agglomerates in the present invention can be derived from waste materials such as used paper, cardboard, wood scrap, bagasse (sugar cane waste), or municipal waste. When the latter is used, it makes no difference whether the waste is general waste or hazardous waste, because of the subsequent heat processing which destroys the heat-sensitive components of the waste. Use of cellulose fiber as a preferred binder can result in substantial cost savings over the conventional binder of lime/molasses. In addition, the green agglomerate strength as well as reduced compact strength is higher than agglomerates made with lime/molasses or other commonly used binders.

Prior to agglomeration, the cellulose fiber material is produced from shredded or pulverized organic material. The source of the cellulose material may be any suitable raw material or post-consumer product streams, including organic waste streams. Sources of cellulose may include, but are in no way limited to new or used paper, new or used newsprint, new or used cardboard, wood scrap, bagasse, which is typically sugar cane waste, and municipal waste, including refuse-derived fuels. Because of its abundance, source material for production of the cellulose fiber binder is very inexpensive, and because the cellulose material may be derived from consumer waste streams, the use of cellulose binders is environmentally friendly.

Figure 1:
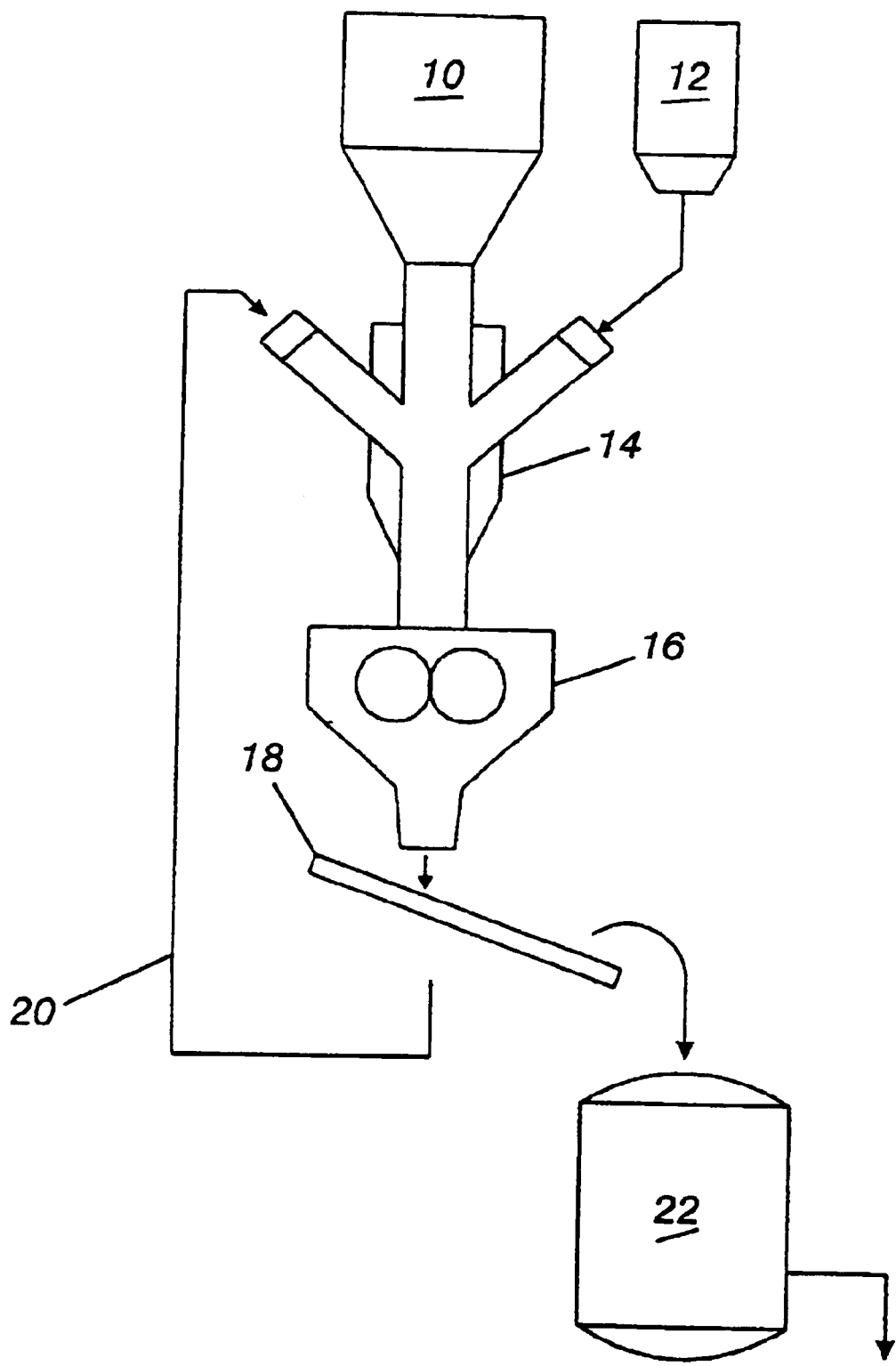
FIG. 1 is a flow diagram showing a method for producing agglomerates in accordance with the invention.

Referring to FIG. 1, waste iron bearing materials are fed from hopper 10 along with binder material from hopper 12 to a mixer 14 and then to an agglomerator which is shown as a briquetter 16. The agglomerated materials exit the agglomerator and may be screened or sized by a suitable device such as screen 18. Fines which pass screen 18 are recycled to the mixer 14 through recycle line 20. The large agglomerates are collected and fed to an iron making or steel making furnace 22. The cellulose fiber binder material is fed, substantially dry, to mixer 14 along with the waste iron bearing materials. The cellulose binder material is preferably about 0.5% to about 2.0% of the total mixture by weight, though the binder may be utilized in quantities up to about 25% by weight. The waste iron materials originate from steel furnace baghouse dust or collected dust and fragments of previous briquetting operations. Alternatively, the waste iron bearing materials come from other steps in the steel making process or are transported from off-site steel production facilities having iron bearing waste streams. The iron bearing material is typically blast furnace dust, blast furnace sludge, BOF (basic oxygen furnace) dust, BOF sludge, mill sludge, mill scale, turnings, metallized DRI fines, sinter dust, cupola dust, or waste pellet fines. Alternatively, electric arc furnace (EAF) dust may be used as a source of waste iron. Use of EAF dust as a feed to the invented process is significant since EAF dust is classified as a hazardous waste, which may be minimized by recycling the waste through the invented process. By using cellulose fiber as the binder, the particle size of the iron bearing materials need no longer be finely ground as required by binders in the prior art. For example, 5 to 10 percent of the iron bearing particles can be up to 6 mm, while still achieving a strong agglomerate.

If needed, virgin iron ore, in the form of fines, is added to the mixture. Depending on the composition of the waste iron materials in the mixture and the desired composition of the finished reduced briquette, virgin iron materials may be added to dilute undesired constituents of the waste iron, such as large percentages of sulfur, manganese, chromium, etc., to consume excess carbon, or simply to increase the level of iron.

Finally, reductant materials are added to the mixture, the preferred reductant materials being coke breeze, petroleum coke fines, CDQ (cold dust quench) fines, and most preferably pulverized coal. Any other reductant commonly used in the dirt reduction of iron is also acceptable, including charcoal or graphite. The amount of reductant required depends upon the relative amount of iron components within the mixture as well as the amount of cellulose binder utilized. It has been found that cellulose fiber material effectively act as a reductant and in some circumstances can replace some or all of the more costly beneficiated reductants. Thus, the potential exists for the reductant component in the agglomerate to be 100% replaced by cellulose material, especially if there is an economic advantage to doing so. Although various sizes of reductant material result in an acceptably strong agglomerate, reductant is preferably pulverized coal, with 80% of the coal able to pass 200 mesh screening.

Depending on the feed materials used during fabrication of the agglomerate, it may be advisable to add supplemental water to the mixture of iron-containing material, reductant, if any, and cellulose binder. Water added to the mixture within the range of 0% to 5% by weight of the mixture aids in the binding process, resulting in a stronger agglomerate. For situations in which the green mixture contains high water content, between 3% and 5% by weight, the mechanical action from the briquetting operation typically results in a 0–2% by weight reduction in overall moisture content due to the physical compression of the agglomerate material and the literal squeezing out of water. In the case of briquettes, no drying of the green briquettes is required and the briquettes can be directly charged to the heating furnace.

Cellulose fiber is not a very dense binding material, so the mixture of binder, iron containing material, and reductant, if any, is not very dense, especially at high levels. The mixture is thus preferably briquetted rather than pelletized so that the high pressure briquetting process will compact the agglomerate.

Laboratory tests have shown that agglomerates produced with a cellulose binder in accordance with the invented method have comparable or higher green strength to agglomerates made from other binder systems, even with 10% of −3 mesh size iron-bearing materials. (See FIG. 5). Also, heated agglomerates containing cellulose binder have significantly higher crush strength than agglomerates made from other binders after 7 to 10 minutes exposure to temperatures of 1000° C. to 1288° C. under nitrogen and/or reducing atmospheres. Furthermore, the cellulose fiber binder exhibits an increase in DRI crush strength as a function of heating time, usually between no binder combinations of the prior art displayed the observed increase in DRI crush strength as a function of heating time (8–12 minutes) that was achieved with the cellulose fiber binder.

After briquetting, the briquettes are fed into a heat treating furnace, preferably a Rotary Hearth Furnace, wherein they are heated at a temperature of about 1000° C. to about 1300° C. for a period of about 6 to about 20 minutes. The preferred heating time is about 7 to about 9 minutes. By utilizing this limited heating time, which should not exceed 20 minutes total time in the furnace, the resulting briquette is surprisingly strong. The atmosphere in the heating furnace can be oxidizing, inert or reducing, i.e., 0 to about 10% combustibles (as $H_2$+CO). Agglomerates may be initially heated in an oxidizing atmosphere, followed by further heating in an inert and/or reducing atmosphere. Furthermore, metallization of a carbon-containing iron-bearing agglomerate is related to the residual carbon content.

When used as a feed material to a steelmaking furnace, the high strength briquette holds together and penetrates the slag layer easily in the molten metal bath of the steelmaking furnace.

It has been found that cellulose fiber material is a very cost-effective binder for the agglomeration of sized iron bearing materials with or without any other reductant. Small quantities of cellulose binder (0.5–2% by weight) have been found to work extremely well (e.g., measured green strength). Other binder systems require more binder to achieve similar results. In some circumstances, a small quantity of cellulose binder can be used in conjunction with or as a supplement to conventional binders in order to develop added strength benefits to agglomerates. Also, because of the improved binding properties of the cellulose fiber binder, it is possible to produce strong green agglomerates from large particle sizes (0.25 to 1.0 mm).

EXAMPLES

Example 1

The usefulness of cellulose as a binder in green briquettes was tested by preparing a series of test samples, each consisting of a 20 kg batch of iron-containing waste material. Each batch contained approximately 80% by weight of iron ore pellet feed (−0.074 mm) and iron oxide fines (~0.85 mm) and approximately 20% by weight of pulverized coal as a reductant, sized so that 80% of the reductant was under 200 mesh (−0.074 mm). Applicable binders were added to the mix in amounts of approximately 1% by weight. The components were mixed in a lab mix muller for approximately 5 minutes. The entire batch was then fed to an industrial briquetting machine. After briquetting, good whole briquettes were separated by hand from any fragments or remaining particulates. The fragments and particulates were recycled to the briquetting machine. Green briquette crush strength was determined by analyzing ten random samples from the good whole briquettes. The briquettes were then reduced in a Thermcraft box furnace at 1288° C., under 5 standard liter/minute $N_2$ purge. The box furnace had similar reduction characteristics as those of a true industrial direct reducing furnace. Reduced briquettes were quickly removed from the box furnace at prescribed times and allowed to cool in a $N_2$ purged chamber.

Figure 2:
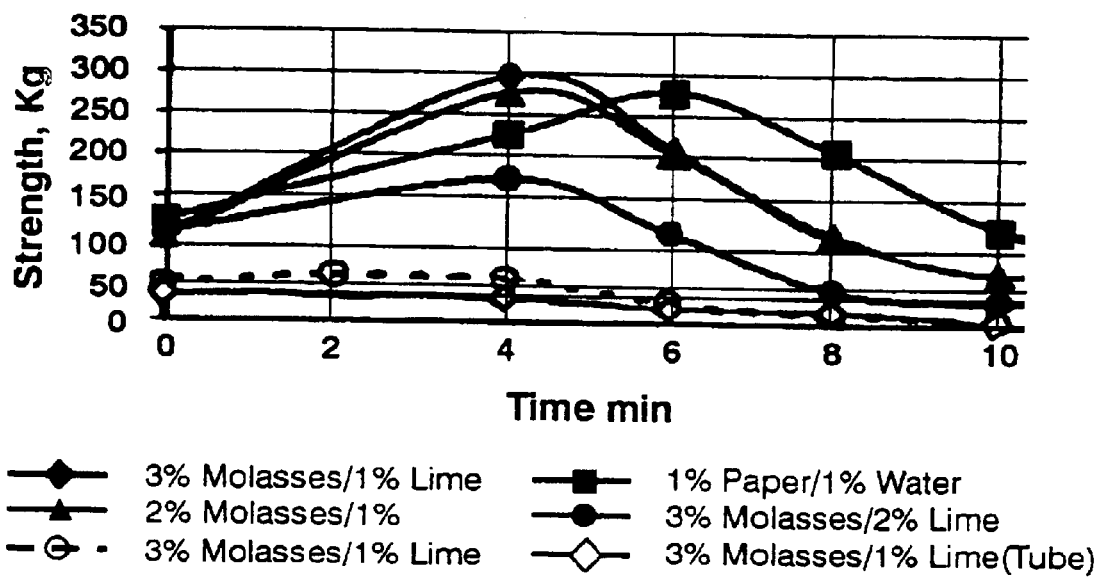
FIG. 2 is a graph comparing crush strength of briquettes made with various binders to the processing time in a box furnace.

Referring to FIG. 2, analysis of 20 cc briquettes revealed that a 1% paper/1% water binder appears to be superior to a 3% molasses/1% lime binder. Green briquette strength was slightly higher for the cellulose binder, and DRI strength after 8 minutes of reduction was nearly twice that of 3% molasses/1% lime, and 2% molasses binders. Reduceability of the briquette with the cellulose binder was also found to be acceptable.

Figure 3:
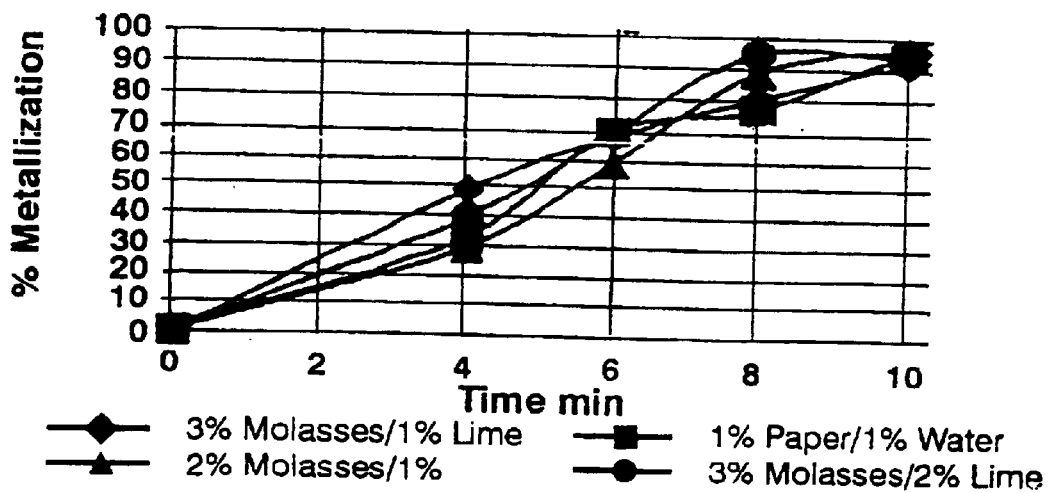
FIG. 3 is a graph which shows metallization versus processing time for briquettes made with four different binders.
Figure 4:
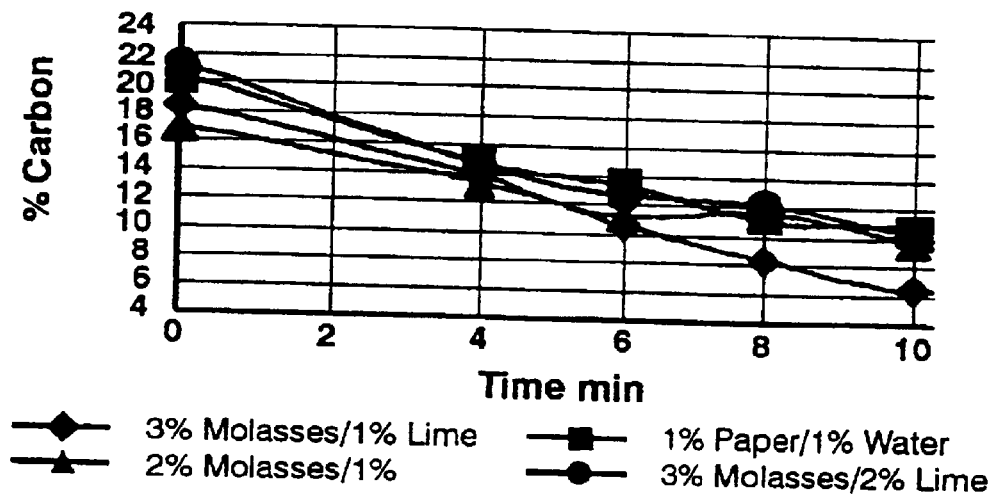
FIG. 4 is a graph showing carbon retained in briquettes made with four different binders, according to the heat processing time in the furnace.

Referring to FIGS. 3 and 4, the cellulose binder showed similar reduction characteristics to that of the molasses/lime binders. FIG. 3 shows that the reduction curve and total reduction of above 90% after 10 minutes are very similar to the characteristics of briquettes having molasses/lime binders. FIG. 4 shows the diminishing amount of carbonaceous reductant that corresponds to the reduction of the briquette over time. Carbon content of the cellulose binder sample is diminished at a rate very similar to the molasses/lime samples. Thus, satisfactory reduction times can be achieved with the invented agglomerates using cellulose fillers.

Figure 5:
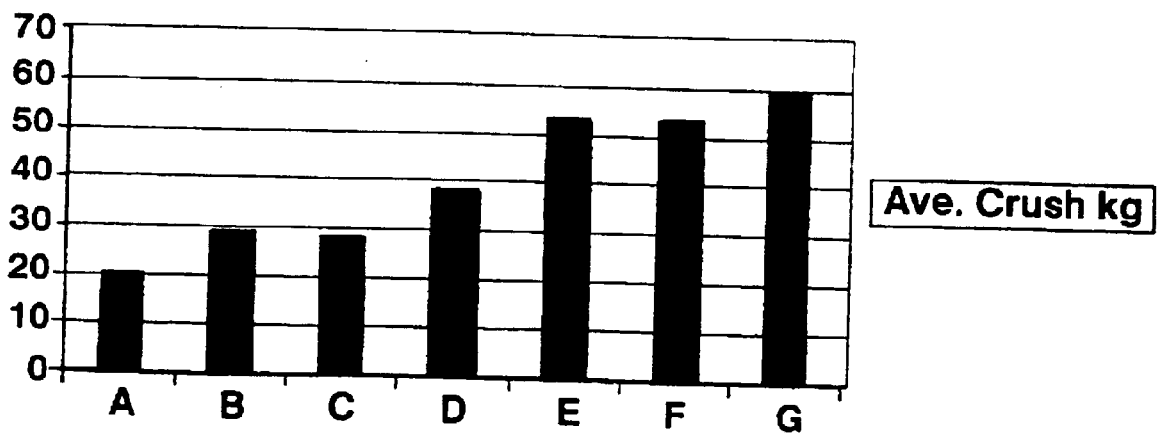
FIG. 5 is a graph showing the average crush strength of green briquettes prepared with a variety of different binders.

FIG. 5 summarizes a comparison of the average crush strengths of green agglomerates produced with a variety of binders in accordance with the invention. As shown, the cellulose containing newsprint (E), cardboard (G), and fluff, i.e., shredded paper (D=1%, F=2%) all resulted in briquettes having a much greater crush strength than the standard binder combinations of lime and molasses (A=1% lime/3% molasses, B=2% lime/4% molasses). Only the bagasse (C), a cellulose product derived from sugar cane stalks, failed to show notable improvement over the lime and molasses of the prior art.

Example 2

A study was conducted on 12 cc briquettes produced in a substantially similar manner to those produced in Example 1, except that the agglomerate composition consisted of approximately 64.5% virgin iron feed, 20.5% coal reductant, 13% screened pellet fines, and a 1% cellulose/1% water binder combination. Separate trials were run using the above combination of materials with the 13% of screened pellet fines being −3 Mesh (−6.7 mm), −6 Mesh (−3.35 mm), and −20 Mesh (−0.85 mm).

Figure 6:
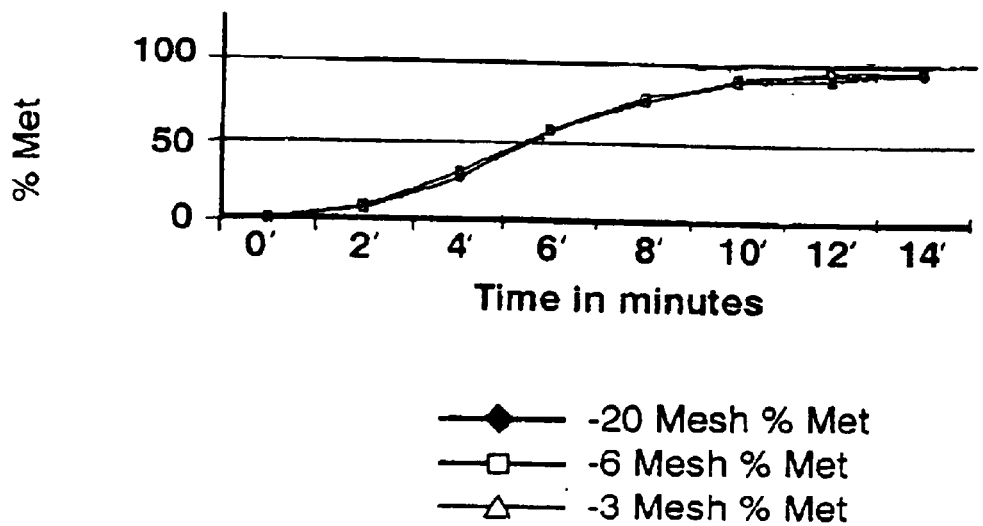
FIG. 6 is a graph showing percent metallization of briquettes prepared cellulose binder and various sizes of iron fines.
Figure 7:
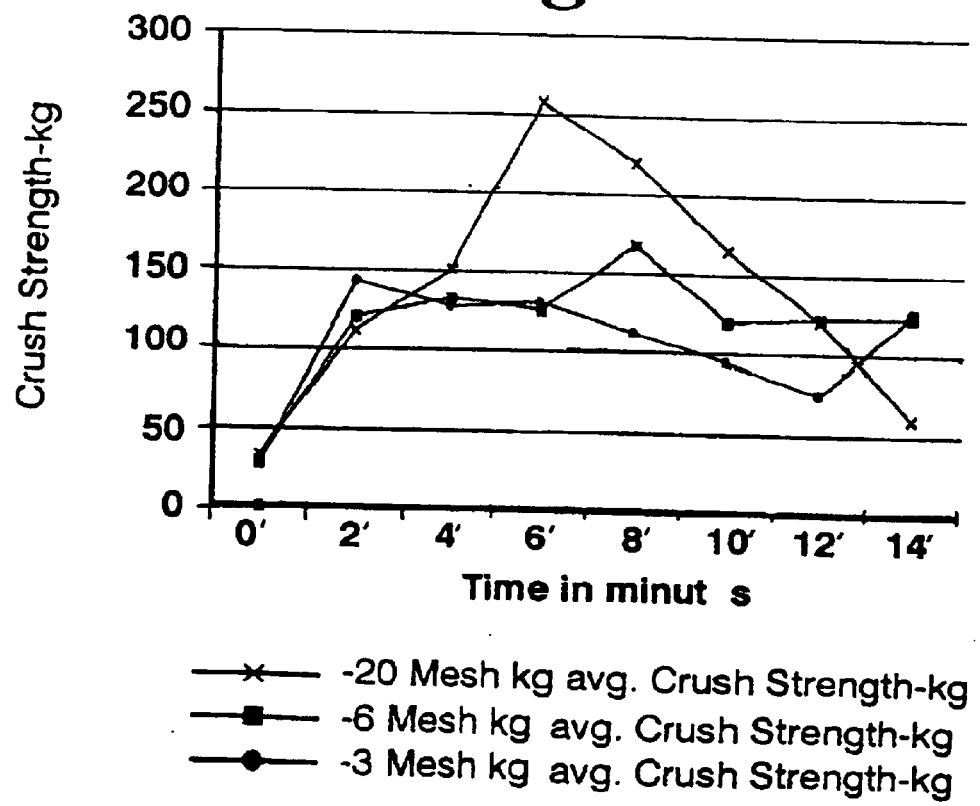
FIG. 7 is a graph showing crush strength of briquettes prepared with cellulose binder various sizes of iron fines.

Referring to FIG. 6, it was found that the compacts having smaller fine particle size exhibited higher green crush strengths, but that even the compacts made with the large −3 Mesh fines had acceptable average compact green crush strength of 26 kg. This compares to the 33 kg green crush strength developed with a −20 Mesh fines fraction. With further reference to FIG. 6, the large −3 Mesh fine fraction did not adversely affect DRI metallization, as the metallization achieved with compacts of various fine size was almost identical. DRI produced from the mixture containing the −3 Mesh fines fraction exhibited good crush strength of 91 kg after 10 minutes reduction time. Thus, the cellulose binder allows large iron fines to be formed into agglomerates with high crush strength and favorable reduction qualities.

SUMMARY OF THE ACHIEVEMENT OF THE OBJECTS OF THE INVENTION

From the foregoing, it is readily apparent that we have invented an improved process for making a strong briquette for further processing into carbon-bearing steel, and a carbon-bearing direct reduced iron briquette having a metallization of at least 40% up to about 85% and improved strength.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A process for making metallized iron by reduction of iron oxide from green briquettes, said process consisting essentially of:

combining in a dry form materials forming a mixture consisting of iron bearing material, a reductant, cellulose fiber, and 0% to 5% added water by weight of the mixture;

compacting the mixture under high pressure into green briquettes with high crush strength;

direct feeding the green briquettes into a rotary hearth furnace; and heating the green briquettes initially in an oxidizing atmosphere followed by further heating in an inert or reducing atmosphere at a temperature from about 1000° C. to a about 1550° C. for a period of 6 to 20 minutes, therein metallizing iron forming metallized briquettes with good crush strength.

2. The process according to claim 1, wherein id iron bearing materials are selected from the group consisting of iron ore, blast furnace dust, blast furnace sludge, basic oxygen furnace dust, EAF dust, basic oxygen furnace sludge, mill scale, pellet fines, metallized DRI fines, turnings, mill sludge, sinter dust, cupola dust, and mixtures thereof.

3. The process according to claim 1, wherein said cellulose fiber is selected from the group consisting of shredded organic wastes, paper, newsprint cardboard, wood scrap, bagasse (sugar cane waste), sewage sludge, municipal waste, refuse-derived fuels, and mixtures thereof.

4. The process according to claim 1, wherein said reductant is selected from the group consisting of CDQ dust, pulverized coal, petroleum coke fines, charcoal, graphite, and other reductants commonly used in the direct reduction of iron.

5. The process according to claim 1, wherein said green briquette is composed of sufficient reductant to reduce the iron oxide to iron forming the metallized briquette.

6. The process according to claim 1, wherein from 0.5 to 15 percent of the iron bearing feed material has a particle size of up to 6 mm in size.

7. The process according to claim 1, wherein said cellulose fiber comprises 0.5 to 2.0% by weight of the green briquette.

8. The process according to claim 1, wherein said metallized briquette forms at least 40% metallized iron.

* * * * *